United States Patent [19]

Suzuki

[11] Patent Number: 5,411,923
[45] Date of Patent: May 2, 1995

[54] SILICON NITRIDE BASE SINTERED BODY

[75] Inventor: Junichiro Suzuki, Gifu, Japan

[73] Assignee: NGK Spark Plug Co., Ltd., Nagoya, Japan

[21] Appl. No.: 701,640

[22] Filed: May 15, 1991

Related U.S. Application Data

[63] Continuation of Ser. No. 441,001, Nov. 22, 1989, abandoned.

[30] Foreign Application Priority Data

Nov. 24, 1988 [JP] Japan .................. 63-297021

[51] Int. Cl.⁶ .............................. C09B 35/58
[52] U.S. Cl. ........................... 501/97; 501/95; 501/98; 51/307
[58] Field of Search ............ 407/119; 501/95, 97, 501/98; 51/307

[56] References Cited

U.S. PATENT DOCUMENTS 4,818,635  4/1989  Ekström et al. ............ 501/97
4,880,755  11/1989 Mehrotra et al. ............ 501/97

FOREIGN PATENT DOCUMENTS 153575  6/1989  Japan .
216433  6/1989  Japan ............. C04B 35/58

Primary Examiner—Mark L. Bell
Assistant Examiner—C. M. Bonnar
Attorney, Agent, or Firm—Fish & Richardson

[57] ABSTRACT

A silicon nitride body having a surface portion comprising $\alpha$ sialon, or $\alpha$ sialon and $\beta$ sialon wherein the ratio of $\alpha$ sialon relative to the sum of $\alpha$ sialon and $\beta$ sialon is at least 0.6; and an inner portion comprising $\beta$ sialon, or $\alpha$ sialon and $\beta$ sialon, wherein the ratio of $\beta$ sialon relative to the sum of $\alpha$ sialon and $\beta$ sialon is at least 0.6.

22 Claims, 2 Drawing Sheets

Y-Si-Al-O-N SYSTEM $\alpha$-RATIO $\{\alpha/(\alpha+\beta)\}$ OF SURFACE PORTION

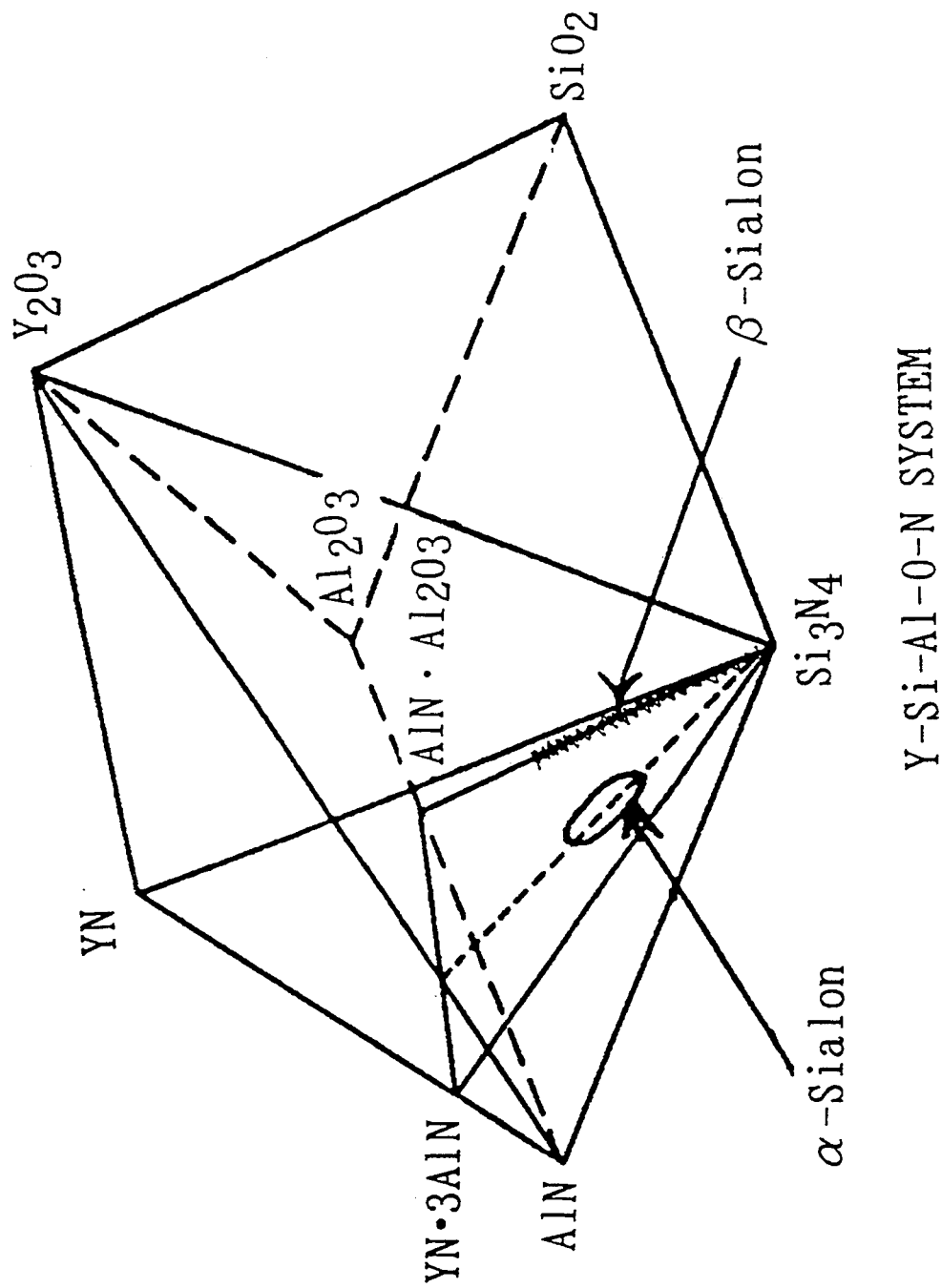

SILICON NITRIDE BASE SINTERED BODY

This application is a continuation of U.S. application Ser. No. 07/441,001, filed Nov. 22, 1989, now abandoned.

FIELD OF THE INVENTION

The present invention relates to a silicon nitride base sintered body, particularly an improved one which has sufficient wear resistance, toughness and strength. The present invention is applicable to cutting tools, wear resistant parts, sliding parts or the like.

BACKGROUND

In the conventional silicon nitride sintered bodies, ones of which the surface is coated with ceramic material having high hardness and wear resistance in order to improve the wear resistance has been known (JP Patent Kokoku Publication No. 63-1278 (1988)).

A further silicon nitride sintered body has been known in which crystal phases of both $\alpha$- and $\beta$-Sialons are homogeneously distributed over the entire sintered body (JP Patent Kokoku Publication No. 63-35594 (1988) etc.). Problems to be solved by the present invention:

As for the former sintered body, it is difficult to obtain a sufficient bonding force to the substrate through the difference in thermal expansion and/or chemical affinity between the coating ceramic material and the silicon nitride substrate, entailing a high cost counted as a problem in economy. Thus the former sintered body has found almost no practical application.

The latter sintered body which includes both the crystal phases of $\alpha$- and $\beta$-Sialons evenly distributed over the entire sintered body suffers variation in its properties as their proportion changes and cannot develop every property. Namely, if one attempts to enhance one property any of other properties is forced to be deteriorated, resulting in an intermediate performance on balance of the both.

SUMMARY OF THE DISCLOSURE

Therefore, it is a primary object of the present invention to provide a novel silicon nitride base sintered body which can eliminate the drawbacks aforementioned in the prior art. More specifically it is an object of the present invention to provide an improved silicon nitride sintered body in which the wear resistance, toughness and strength which $\alpha$- and $\beta$-Sialons possess can be sufficiently developed and every such property is improved over the conventional silicon nitride sintered body.

According to the first aspect of the present invention, there is provided a silicon nitride base sintered body comprising:

a surface portion comprising $\alpha$-Sialon, or $\alpha$-Sialon and $\beta$-Sialon wherein $\alpha$-Sialon has a ratio of at least 0.6 relative to the sum of $\alpha$-Sialon and $\beta$-Sialon as measured by the X-ray peak intensity ratio method; and an inner portion comprising $\beta$-Sialon, or $\beta$-Sialon and $\alpha$-Sialon wherein $\beta$-Sialon has a ratio of at least 0.6 relative to the sum of $\alpha$-Sialon and $\beta$-Sialon.

Thus, the inventive silicon nitride base sintered body is characterized by a different major crystal phase in the surface portion and the inner portion, respectively. Thus it can develop the high wear resistant property of $\alpha$-Sialon (in the surface portion) as well as the high toughness and strength of $\beta$-Sialon (in the inner portion), which every property is also superior to the conventional silicon nitride sintered bodies.

That is, the inventive silicon nitride base sintered body exhibits the high hardness and low wear which are the properties of $\alpha$-Sialon due to the $\alpha$-Sialon ratio of at least 0.6 in the surface portion, on the other hand it sufficiently exhibits also the high toughness and strength which are the properties of $\beta$-Sialon due to the $\beta$-Sialon ratio of at least 0.6 in the inner portion. Accordingly, the inventive sintered body can sufficiently develop the properties which each of $\alpha$- and $\beta$-Sialons should possess thus in the all can exhibit improved wear resistance, toughness and strength over the conventional sintered body in which $\alpha$-Sialon and $\beta$-Sialon are uniformly distributed over the entire body including the surface portion and the inner portion.

In the following the present invention will be further elucidated based on the preferred embodiments by reference to the Drawings.

BRIEF DESCRIPTION OF THE DRAWINGS

FIG. 4 shows Y—Si—Al—O—N system phase diagram.

Figure 1:
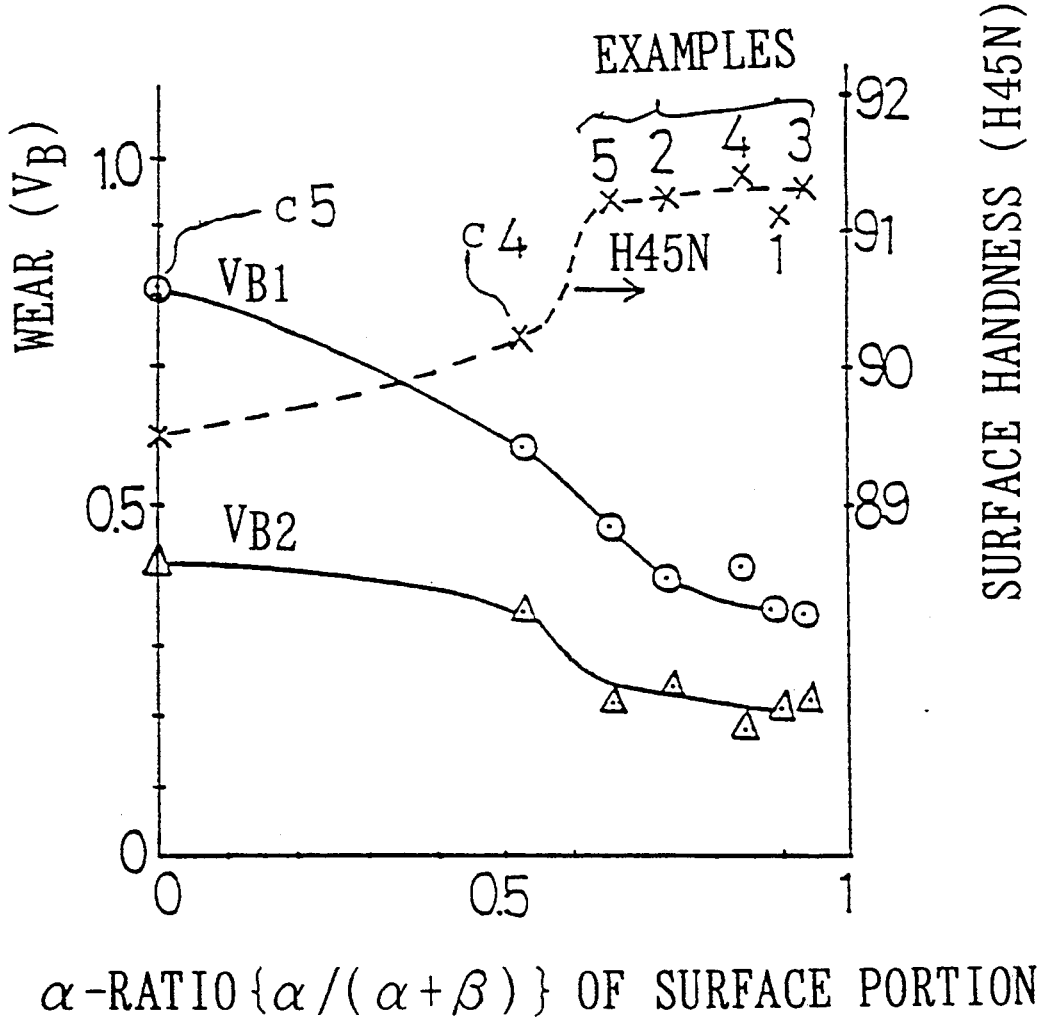
FIG. 1 is a graph showing the relation of the $\alpha$-Sialon ratio in the surface portion versus the wear and hardness.

In the Figures: the numeral 1 represents a work piece, 2 cutting tool (tip) of silicon nitride sintered body, and 3 holder, respectively.

DESCRIPTION OF THE PREFERRED EMBODIMENTS

The surface portion may contain only $\alpha$-Sialon, or both of $\alpha$- and $\beta$-Sialons. The inner portion may be comprised of $\beta$-Sialon, or both of $\beta$- and $\alpha$-Sialons. The ratio of any one of both Sialons relative to the sum of both the $\alpha$- and $\beta$-Sialons is those calculated by X-ray diffraction measurement based on the intensity ratio of the X-ray spectra peaks (referred to as "X-ray peak intensity ratio method"). The thickness of the surface portion may be varied according to the purpose, utility and production process and the like, and in general not thicker than 0.1 mm and preferably not thinner than 0.01 mm. In the present invention, the boundary state between the surface portion and the inner portion may assume such a case where the ratio does not rapidly change, i.e., varies continuously and gradually. It is sufficient to meet the requirement for the defined composition ratios in the surface portion and the inner portion, respectively.

The $\alpha$-Sialon and $\beta$-Sialon are contained based on the following grounds in the present invention.

$\alpha$-Sialon is a solid solution of the substitution/interstitial type in which a part of Si elements in the $\alpha$-$Si_3N_4$ structure is substituted with Al, and a part of N elements in the same structure is substituted with O, and further in which elements such as Li, Na, Mg, Ca, Y or rare earth elements form solid solution intruding into the interstitial lattice space between (Si, Al) and (O, N). Generally, such $\alpha$-Sialon is expressed by a formula:

$$M_x(Si, Al)_{12}(O, N)_{18}$$

where M=Li, Na, Mg, Ca, Y or rare earth elements, and $0 < x \leq 2$. This α-Sialon has a higher hardness than β-Sialon or silicon nitride and has a superior wear resistance. However, the crystal grain shape is mainly of spherical grains with low toughness, which fact would offer disadvantage in the toughness if α-Sialon would assume the main constituent phase.

On the other hand, β-Sialon is a solid solution of the substitution type formed of a solid solution of $Al_2O_3$, AlN and $SiO_2$ in β-Silicon nitride i.e., in which Al and O substitute for a part of Si elements and N elements, respectively, in the β-silicon nitride.

This β-Sialon is expressed by a formula:

$$Si_{6-z}Al_zO_zN_{8-z}$$

where $0 < z \leq 4$. Crystal grains of the β-Sialon easily grow in the needle like crystal shape. Thus it is easy to obtain a sintered body of β-Sialon with high toughness and strength. However, its hardness is less than that of α-Sialon, which fact offers a disadvantage in the wear resistance if this α-Sialon assumes the main constituent of the sintered body.

In the inventive sintered body, the surface portion assumes the role to provide the wear resistance and the inner portion assumes the role to provide the toughness and strength, respectively. Therefore, it is contemplated that each role is sufficiently developed in order to achieve all the properties. Therefore, the surface portion comprises α-Sialon as a major phase which is superior in the wear resistance among the both. On the other hand, the inner portion comprises β-Sialon as a major phase which is superior in the toughness and strength among the both.

The surface portion contributes to the wear resistance required as the wear resistant material. Thus the amount (ratio) of α-Sialon in the surface portion is made greater to be 0.6 or more, since the increased hardness with a reduced wear can be achieved within this range based on the increased amount of α-Sialon therein, as shown in the result of Examples hereinafter mentioned. In other words, below this ratio of α-Sialon, the sufficient wear resistance cannot be achieved. The α-Sialon ratio in the surface portion is preferably 0.7 or more.

The inner portion contributes to the toughness and/or strength of the sintered body. Therefore the β-Sialon ratio in the inner portion is increased to 0.6 or more because this increased amount of β-Sialon provides the toughness and strength as shown in the test result of the Examples mentioned hereinafter.

As for the grain size, β-Sialon is preferably of a high aspect ratio as the toughness and strength increase with the increasing aspect ratio. More preferably, the aspect ratio of β-Sialon is 2 to 15. However, it would offer some difficulty in removing pores at the grain boudary when the proportion of such grains is increased. Thus it is preferred to make a structure in which an appropriate amount of fine spherical grains are distributed. The fine spherical grains may be either β-Sialon grains which has not been grown sufficiently, or α-Sialon, or remaining α-silicon nitride grains which result from the admixed starting material particles thereof.

In the present invention, the sum of α- and β-Sialons preferably assumes 60–95 vol % of the entire sintered body. Above 95 vol %, the sinterability will decrease, while below 60 vol % the properties of α- and/or β-Sialons may not sufficiently be developed. This sum is preferably 70–95 vol %.

The silicon nitride base sintered body may include boundary phase components or, additionally, further third components other than the boundary phase components. The third components are preferably those which are effective for further improving the wear resistance and/or toughness, and may be at least one of oxide, carbide, nitride, carbonitride, oxy-carbonitride, boride or the like of the transition metals of subgroups IVa, Va and VIa of the International Periodic Table. The boundary phase may be of glassy phase alone, or glassy phase with additional various crystal phases. Preferred are TiN, $ZrO_2$, TiC, WC, $TiB_2$, $HfO_2$, ZrC and/or whiskers such as SiC and/or $Si_3N_4$, preferably of a diameter of 0.3–2.0 μm with a length of 10–100 μm.

The inventive silicon nitride base sintered body may be produced in principle in the following manner. First, a starting powdery mixture of constituent materials which forms the α- and β-Sialons is weighed out in a predetermined proportion, mixed and milled for pulverization. That is the starting powdery mixture comprises $Si_3N_4$ and other selected constituent materials from the group such as $Al_2O_3$, AlN, $SiO_2$, AlON, $Si_2ON_2$, $Y_2O_3$, YN, MgO, CaO, $Na_2O$, oxides or nitrides of rare earth elements and the like. The starting powdery mixture is press-formed (compacted) in a desired shape followed by sintering. The sintering is conducted in principle under a nonoxidizing atmosphere containing nitrogen in order to prevent $Si_3N_4$ from decomposition. This sintering atmosphere is kept preferably at a pressure of one atm or above. The sintering is conducted preferably at a temperature range of 1550°–1800° C., more preferably of 1600°–1750° C. In order to remove possible defects in the sintered body and to further enhance the strength, HIP (hot isostatic pressing) may be applied after the sintering for example at 1400°–1900° C. (preferably 1500°–1800° C.) under a pressure of 500–2000 atm in $N_2$ or inert gas such as Ar.

There are various manners to convert the surface portion into α-Sialon, for instance:
(a) sintering in a slightly reducing atmosphere (e.g., at 1550°–1800° C., preferably 1600°–1750° C.) for 0.5–5 hours (preferably 1–3 hours)),
(b) applying a coating layer of materials which are apt to form α-Sialon, such as AlN, $Y_2O_3$ and/or Sialon powder followed by firing to form a sintered coating layer. This firing step for the coating layer may be done as the resintering of the sintered body (substrate). The substrate on which the coating layer is to be applied may be either of a calcined state or of a sintered state. The coating layer may be applied as a paste of the powdery materials or formed by performing the firing the compact embeded in the powdery materials, or
(c) firing in a specific atmosphere, e.g., nitrogen, inert gas, CO, $CO_2$ or mixed gas thereof.

The relationship between α- and β-Sialon will be explained by reference to FIG. 4 (Y-Sialon system phase diagram). FIG. 4 is a pseudo-sexinary phase diagram in a triangular prism structure of the system $Si_3N_4$—$SiO_2$—AlN—$Al_2O_3$—YN—$Y_2O_3$ in which α-Sialon and β-Sialon are marked at the place each of them occurs, respectively, provided that β-Sialon occurs on a bottom surface defined by $Al_2O_3$—AlN—$Si_3N_4$—$SiO_2$ points. That is, if $Si_3N_4$ (as starting material) is present together with Al, Y, O, N and the like, these elements form solid solution in Si$_3$N$_4$ during the sintering process to form primarily β-Sialon. This is because that pure Si$_3$N$_4$ is stable in the β-type at a high temperature and first becoming β-Sialon. Therefore, the region where α-Sialon occurs does not extend to the Si$_3$N$_4$ corner in FIG. 4 and is limited rather than the β-Sialon region. However, there is a case where α-Sialon results depending on the proportion of the elements and systhesizing conditions. As is evident from FIG. 4, such case is characterized by:

(1) case where there exist elements such as Y etc. having a electro negativity of 0.1–1.3 and an ion radius of 0.107 nm or less, which elements can enter the interstitial space of Sialon to from solid solution and neutralize it electrically; or
(2) case where the proportion of O and N is greater in α-Sialon than β-Sialon, i.e., substitution rate of O is smaller in α-Si$_3$N$_4$ than β-Si$_3$N$_4$.

Accordingly,
(a) as above is effective to reduce the substitution rate of O in case (2) above (slightly reducing atmosphere is effective to prohibit O from substituting for N).
(b) as above is utilizing (1) and (2), wherein YN, AlN etc. are particularly useful as such powders.
(c) is related with (2) above, in which substitution of Al and O for Si$_3$N$_4$ is prohibited. In the sagger of Si$_3$N$_4$, the atmosphere caused by decomposition of Si$_3$N$_4$ into Si and N can prohibit the decomposition of the compact to be sintered due to the particular gas pressures. Sealing of saggers is not necessary and it may be of a degree such that this atmosphere will not dissipate, e.g., through N$_2$ gas flow etc.

For use as a cutting tool, side surfaces (two or corner) of the sintered body are usually used in an assintered surface. Thus the surface state should not be made rough. The surface portion may be used also in a state where at least a part of the particular surface portion remains after finish machining (i.e., the surface portion is not completely removed by grinding).

The α-Sialon grains should be as fine as possible, and preferably 10 micrometers or less (more preferably 3 micrometers or less). The β-Sialon grains are preferably of the columnar shape, particularly of highly flattened configuration. A size of 20 micrometers or less in a long axis direction is preferred (more preferred 10 micrometers or less). The β-Sialon in the surface portion is preferably of 5 micrometers or less and smaller in size than the same in the inner portion.

Typically, the starting powdery mixture may be formulated as follows:

| | |
|---|---|
| Si$_3$N$_4$ | 50–95 wt %, preferably 60–90 wt % |
| sintering aid* | 5–30 wt %, preferably 10–20 wt % |
| third component** | 30 wt % or less, preferably 25 wt % or less |

*sintering aid: Al$_2$O$_3$, AlN, Y$_2$O$_2$, MgO, SiO$_2$, AlON, Si$_2$ON$_2$ or the like
**TiN or the like The averages partical size of the sintering powdery mixture before sintering is preferably 5 μm or less, more preferably 2 μm or less.

EXAMPLES

In the following the preferred embodiments of the present invention will be described in more detail with reference to the examples.

Raw material powders were weighed out in compositions as set forth in TABLE, wet-milled in a ball mill for 48 hours, added with a binder followed by drying. Following raw material powders were used: Si$_3$N$_4$ powder having an average particle size of 0.6 μm (at least 90 vol % α-phase); α-Al$_2$O$_3$ and MgO having an average particle size of 0.5 μm; AlN powder having an average particle size of 1.3 μm; Y$_2$O$_3$ powder having an average particle size of 1.2 μm; and TiN powder having an average particle size of 1.4 μm.

The resultant dried powder mixtures (starting powder mixture) were press-molded by metallic dies to form compacts which were placed in saggers made of silicon nitride. The saggers were placed in a carbon case and sintered at 1650°–1750° C. to obtain sintered bodies. The sagger is a container made of a refractory material in which articles (compacts) are retained and supported in order to avoid the influence of flame, ash and/or soot as well as to enable a stack of such saggers upon placing in a furnace. The sintering was carried out in a slightly reducing atmosphere to make sintered bodies. The sintering in the silicon nitride sagger is believed to serve to prevent a rough surface formation and promote α-Sialon formation. The sintering in the carbon case has the same effect as the sintering in the silicon nitride sagger. The resultant sintered bodies were measured for α-Sialon ratio (referred to as "α-ratio") in the surface portion and β-Sialon ratio (referred to as "β-ratio") in the inner portion by the X-ray peak intensity ratio method, where:

$$\alpha\text{-ratio} = \frac{\alpha}{\alpha + \beta}$$

$$\beta\text{-ratio} = \frac{\beta}{\alpha + \beta}$$

The results are shown in TABLE. The sum (vol %) of α- and β-Sialons in the entire sintered body was measured by a reflected electron image taken by SEM (scanning electron microscope), and the image was subjected picture processing analysis. The results are also shown in TABLE. The surface portion was measured also for the thickness based on surface removal through grinding and micro zone X-ray analysis, which resulted in a thickness of about 0.01 to an order of 0.1 mm.

Figure 2:
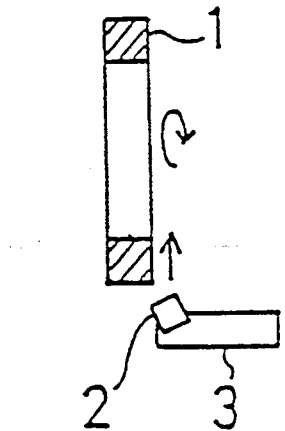
FIG. 2 is a schematic cross-sectional illustration showing the shape of a work piece employed in Cutting Test 1, etc.
Figure 3:
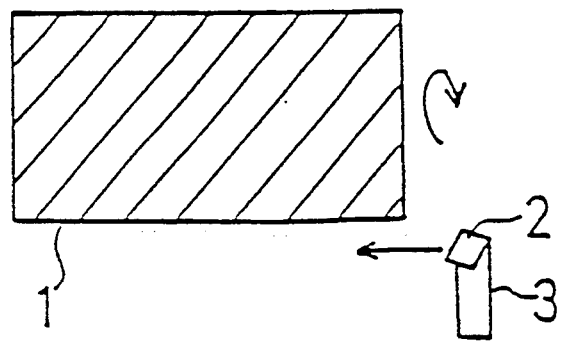
FIG. 3 is a schematic cross-sectional illustration showing the shape of a work piece employed in Cutting Test 2, etc.

For cutting tests, the sintered bodies were machined (ground) into a shape with dimensions of "SNMN432" (JIS B4 103), in which only upper and bottom surfaces were finished by grinding remaining two side surfaces as assintered state, resulting in test pieces (tips) 2. The dimensions were adjusted upon press-forming. Two cutting tests were conducted for evaluation (on hardness and wear), and the results are shown in TABLE and FIG. 1. The cutting conditions are as follows:

| | Test 1 | Test 2 |
|---|---|---|
| work | Inconel 718 | FC23 |
| cutting speed (m/min) | 200 | 150 |
| depth of cut (mm) | 1 | 1 |
| feed (mm/rev) | 0.2 | 0.18 |
| coolant | water soluble | none |
| cutting time (sec) | 60 | 300 |
| Shape of work (1 in Figure) | FIG. 2 | FIG. 3 |
| | ring (donut) | rod |
| outer diameter | 300 mm | 240 mm |
| inner diameter | 200 mm | — |
| | thickness 50 mm | length 450 mm |

The numeral 3 in Figures represents a holder. In the TABLE, $V_{B1}$ and $V_{B2}$ represent the amount of wear on the side surface through the cutting test 1 and the cutting test 2, respectively. The hardness (H45N) was measured according to JIS Z 2245.

As shown in FIG. 1, the hardness increases significantly as the α-ratio exceeds 0.6 as compared to Comparative sample 4 with the α-ratio of 0.53 and Comparative sample 5 with the α-ratio 0, accompanying significant reduction in the wear. Therefore, the α-ratio of 0.6 or more provides significant improvement in the wear resistance. Samples 2 and 5 were ground to remove the surface in a depth of about 0.2 mm or more, thereby removing the entire surface portion and exposing the inner portion to prepare Comparative samples 1 and 2, respectively. These two samples suffered particularly great wear. Based on these results, it is demonstrated that the surface portion of each Example is superior.

Comparative sample 3 suffered fracture in the Cutting test 1 ($V_{B1}$) in which the cutting conditions are severer and resultant wear is greater, since the β-ratio of the inner portion is as small as 0.5. This fracture was caused by loss of the strength through wear on the side surface when the wear proceeded. Throughout Examples 1–5, the β-ratio is as large as 0.85–1.0 with a superior strength and thus suffered no fracture even when the wear proceeded similarly.

As demonstrated hereinabove, Examples 1–5 exhibit superior wear resistance and strength and fully develop the performance as the surface portion and the inner portion have the α-ratio and β-ratio both of 0.6 or above respectively.

A coating layer may be preferably applied onto the inventive sintered body, the coating layer being formed of $Al_2O_3$, TiC, TiN, AlON or the like in a thickness of 0.5–10 μm.

It should be noted that modification in the art may be done without departing from the gist and concept of the present invention as disclosed herein and within the scope of claims hereinbelow annexed.

TABLE

| Example | raw material composition (wt %) | | | | | | α-ratio of surface portion | α-ratio of inner portion | Sialon amount vol % | hardness(H45N) | | V B1 | V B2 |
| --- | --- | --- | --- | --- | --- | --- | --- | --- | --- | --- | --- | --- | --- |
| | $Si_3N_4$ | $Al_2O_3$ | $Y_2O_3$ | AlN | MgO | TiN | | | | surface portion | inner portion | | |
| 1 | 83 | 5 | 2 | 10 | — | — | 0.90 | 0.92 | 82 | 91.1 | 89.9 | 0.35 | 0.21 |
| 2 | 83 | 5 | 2 | 10 | — | — | 0.74 | 0.88 | 80 | 91.2 | 90.5 | 0.39 | 0.24 |
| 3 | 88 | — | 6 | 3 | 3 | — | 0.94 | 0.85 | 87 | 91.3 | 90.7 | 0.34 | 0.22 |
| 4 | 66 | 2 | 8 | 4 | — | 20 | 0.85 | 0.95 | 68 | 91.4 | 90.7 | 0.41 | 0.18 |
| 5 | 66 | 2 | 8 | 4 | — | 20 | 0.66 | 1.0 | 65 | 91.2 | 91.0 | 0.47 | 0.22 |
| C1* | sample ground from Ex. 2 | | | | | | | | | 90.5 | 90.5 | 0.75 | 0.39 |
| C2 | sample ground from Ex. 5 | | | | | | | | | 91.0 | 91.0 | 0.69 | 0.37 |
| C3 | 89 | — | 3 | 5 | 3 | — | 0.91 | 0.50 | 87 | 91.8 | 91.2 | Frctd | 0.23 |
| C4 | 66 | 2 | 8 | 4 | — | 20 | 0.53 | 1.0 | 66 | 90.2 | 89.7 | 0.58 | 0.35 |
| C% | commercial Sialon tool | | | | | | 0 | 1.0 | 89 | 89.5 | 89.5 | 0.81 | 0.42 |

*C: comparative examples
Frctd: fractured

What is claimed is:

1. A silicon nitride base sintered body comprising:
   a surface portion comprising α-Sialon, or α-Sialon and β-Sialon wherein α-Sialon has a ratio of at least 0.6 relative to the sum of α-Sialon and β-Sialon as measured by the X-ray peak intensity ratio method; and
   an inner portion comprising β-Sialon, or β-Sialon and α-Sialon wherein β-Sialon has a ratio of at least 0.6 relative to the sum of α-Sialon and β-Sialon.

2. The silicon nitride base sintered body as defined in claim 1, in which the α-Sialon in the surface portion has a ratio of at least 0.7 relative to the sum of α-Sialon and β-Sialon.

3. The silicon nitride base sintered body as defined in claim 1, in which the β-Sialon in the inner portion has a ratio of 0.85–1.0 relative to the sum of α-Sialon and β-Sialon.

4. The silicon nitride base sintered body as defined in claim 2, in which the β-Sialon in the inner portion has a ratio of 0.85–1.0 relative to the sum of α-Sialon and β-Sialon.

5. The silicon nitride base sintered body as defined in claim 1, in which the surface portion is 0.01–0.1 mm thick.

6. The silicon nitride base sintered body as defined in claim 4, in which the surface portion is 0.01–0.1 mm thick.

7. The silicon nitride base sintered body as defined in claim 1, in which the sum of α-Sialon and β-Sialon is 60–95 vol % of the entire sintered body.

8. The silicon nitride base sintered body as defined in claim 6, in which the sum of α-Sialon and β-Sialon is 60–95 vol % of the entire sintered body.

9. The silicon nitride base sintered body as defined in claim 1, in which said surface portion is provided on at least one surface of the sintered body.

10. The silicon nitride base sintered body as defined in claim 8, in which said surface portion is provided on at least one surface of the sintered body.

11. A cutting tool formed of the sintered body as defined in claim 1.

12. The cutting tool formed of the sintered body as defined in claim 10.

13. The silicon nitride sintered body as defined in claim 1, in which the remainder of the body other than said surface and inner portions is a boundary phase of a polytype of Sialon or a boundary phase comprising third crystalline phases other than α- and β-Sialons.

14. The silicon nitride base sintered body as defined in claim 13, in which the third crystalline phases comprise at least one compound of oxide, carbide, nitride, carbonitride, oxycarbonitride and boride of transition metals of subgroups IVa, Va and VIa of the International Periodic Table.

15. The silicon nitride base sintered body as defined in claim 1, in which whiskers are present the whiskers being a thickness of 0.3–2.0 μm and a length of 10–100 μm.

16. The silicon nitride base sintered body as defined in claim 15, in which the whiskers are SiC and/or silicon nitride.

17. A process for making a sintered silicon nitride based body comprising:

providing a starting powdery mixture of materials which can form a sintered body having a surface portion and an inner portion, the surface portion of the sintered body comprising α-sialon or α-sialon and β-sialon, wherein α-sialon has a ratio of at least 0.6 relative to the sum of α-sialon and β-sialon as measured by the X-ray peak intensity ratio method, and the inner portion of the sintered body comprising β-sialon or β-sialon and α-sialon where β-sialon has a ratio of at least 0.6 relative to the sum of α-sialon and β-sialon;

compacting said starting powdery material into a compact; and sintering said compact to produce said sintered body.

18. A process according to claim 17, wherein said sintering is carried out in a non-oxidizing atmosphere containing nitrogen at 1550°–1800° C.

19. A process according to claim 18, wherein said sintering is carried out at 1600°–1750° C.

20. A process for making a sintered body of silicon nitride, comprising the steps of:

preparing a molded body of a first material which can form a sintered body composed of α-sialon or α-sialon and β-sialon, said proportions being defined as the ratio of peak strengths revealed by X-ray diffraction;

disposing about said molded body a second material which can form a sintered surface layer composed of α-sialon and β-sialon, and sintering said molded body and said second material disposed about said molded body to form a sintered body having a surface portion and an inner portion, the surface portion of the sintered body comprising α-sialon, or α-sialon and β-sialon, wherein α-sialon has a ratio of at least 0.6 relative to the sum of α-sialon and β-sialon as measured by the X-ray peak intensity ratio method, and the inner portion of the sintered body comprising β-sialon or β-sialon and α-sialon where β-sialon has a ratio of at least 0.6 relative to the sum of α-sialon and β-sialon.

21. A process according to claim 18, wherein the non-oxidizing atmosphere is a reducing atmosphere comprising a gas selected from the group consisting of nitrogen, inert gases, CO, $CO_2$, and mixtures thereof.

22. A process according to claim 20, wherein the non-oxidizing atmosphere is a reducing atmosphere comprising a gas selected from the group consisting of nitrogen, inert gases, CO, $CO_2$, and mixtures thereof.

* * * * *